Dec. 19, 1967     J. E. GUEST     3,358,795
AUTOMATIC ADJUSTER FOR DRUM BRAKES
Filed July 20, 1966
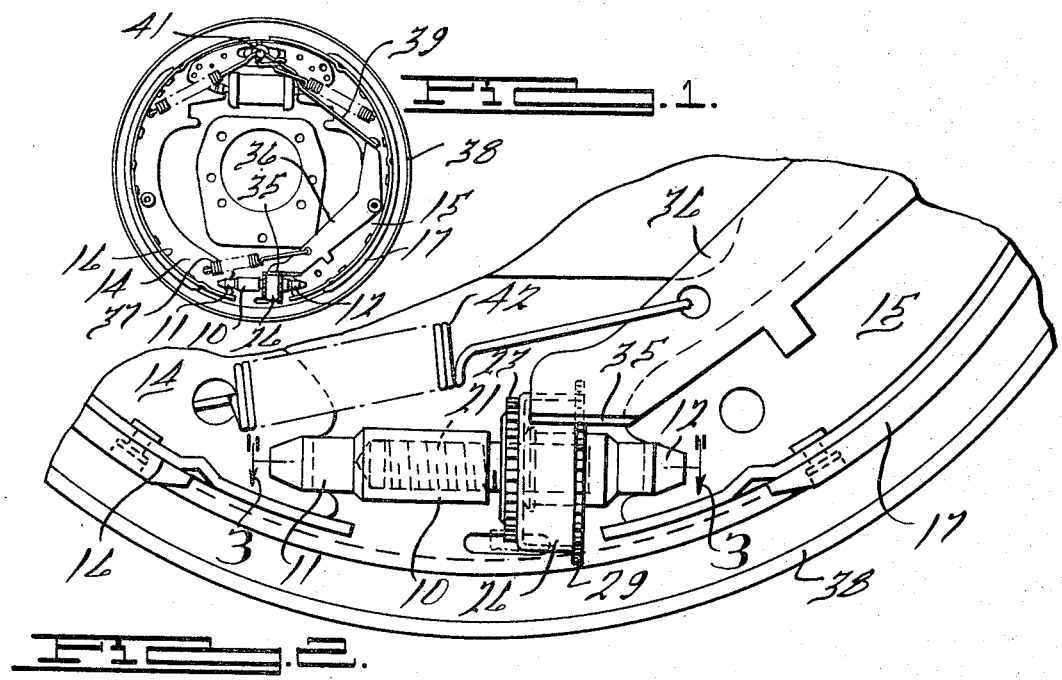
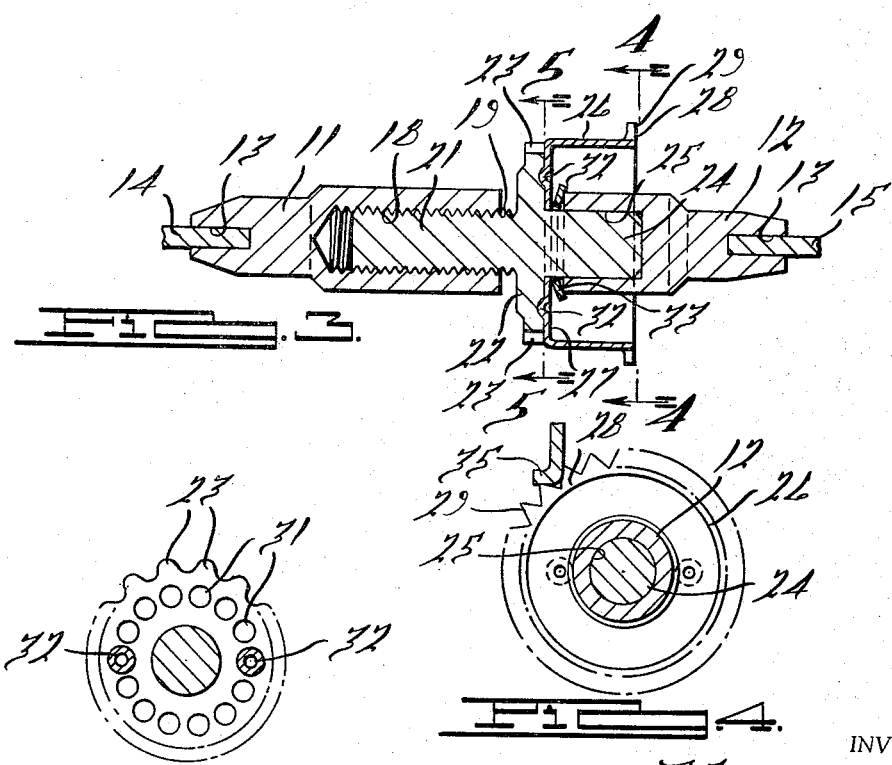
INVENTOR.
John E. Guest
BY
Carness, Dickey & Pierce
ATTORNEYS

United States Patent Office 3,358,795
Patented Dec. 19, 1967

3,358,795
AUTOMATIC ADJUSTER FOR DRUM BRAKES
John E. Guest, Plymouth, Mich., assignor to Kelsey-Hayes Company, Romulus, Mich., a corporation of Delaware
Filed July 20, 1966, Ser. No. 566,577
5 Claims. (Cl. 188—79.5)

ABSTRACT OF THE DISCLOSURE

A drum brake has an automatic device for adjusting the brake shoes relative to a drum to take up the slack due to wear with means for limiting said adjustment. The limiting means comprises a clutch flange connection between the adjusting lever and the adjusting screw.

---

The ends of the two brake sections opposite to those engaged by the fluid actuated brake cylinder, has a pair of slotted sleeves receiving the flanges of the two shoes. One sleeve has an interior thread, the other sleeve has an internal cylindrical wall. A stud has a threaded and a cylindrical end with a star wheel fixed therebetween. The star wheel has peripheral notches which permits manual adjustment of the stud for changing the overall length of the sleeves by the movement of the threaded end of the stud into and out of the associated threaded sleeve.

A clutch element is spring pressed against the star wheel which has recesses in its face adjacent to the element. The adjacent face of the clutch element is provided with at least a pair of projections which extend into a pair of the recesses to form a slip clutch between the abutted faces of the star wheel and clutch element. The clutch element is in the shape of a drum, the open end being flanged and provided with serrations forming teeth by which the slip clutch is advanced. An actuating arm is pivoted to one of the brake shoes which, when the brake is applied as the vehicle is moving backward, causes the actuating element to raise and engage in the next tooth so that after the brake is removed and the vehicle is driven forwardly and the brake applied, the downward motion of the actuating element will occur to advance the clutch element in rotation and turn the stud within the sleeve to increase the overall length thereof. Should a resistance to the rotation of the stud occur the projections on the driven clutch element will move from one pair of diametrically disposed recesses in the face of the star wheel to the next pair thereof. With the clutch arrangement, assurance is had that the brakes are not tightened too much which would produce wear and excess friction when the vehicle is driven.

Accordingly, the main objects of the invention are: to provide a slip clutch between the star wheel on a threaded stud and the drive member therefor which prevents the over adjustment of the brake shoes; to employ a spring pressed slip clutch having projections on its face which extend within the recesses in the abutting face of a star wheel which is advanced by the slip clutch to take up the play in the brake shoes while preventing the over adjustment of the shoes; to provide a drive for a star wheel of a stud which slips relative thereto to limit the amount of force applied to adjust the adjacent ends of the brake shoes relative to each other, and in general to provide a clutch drive in the adjusting mechanism for brake shoes which is simple in construction, positive in operation and economical of manufacture.

Other objects and features of novelty of the invention will be specifically pointed out or will become apparent when referring, for better understanding of the invention, to the following description taken in conjunction with the accompanying drawing, wherein:

FIGURE 1 is a view in elevation of a brake for a wheel showing the interior thereof;

FIG. 2 is an enlarged, broken view in elevation of the adjusting means for the brake shoes illustrated in FIG. 1;

FIG. 3 is an enlarged sectional view of the structure illustrated in FIG. 2, taken on the line 2—2 thereof;

FIG. 4 is a sectional view of the structure illustrated in FIG. 3, taken on the line 4—4 thereof, and FIG. 5 is a sectional view of the structure illustrated in FIG. 3, taken on the line 5—5 thereof.

The adjusting mechanism 10 of the present invention comprises a pair of sleeves 11 and 12 which have slots 13 in the ends for receiving a web 14 and 15 on brake shoes 16 and 17 for positioning the webs 14 and 15 relative to each other. The sleeve 11 has an internal thread 18 which is engaged by a thread 19 of a stud 21. The stud has a star wheel 22 thereon which has serrations 23 on the peripheral edge by which the star wheel is manually adjusted. The opposite face of the star wheel carries a stub shaft 24 which extends within an aperture 25 within the sleeve 12 to have the stub shaft 24 free to rotate within the aperture. A cup-shaped drive element 26 is mounted on the stub shaft 24 with the end wall 27 thereof disposed in abutting relation to the adjacent face of the star wheel 22. The outer edge of the element 23 has an outwardly extending flange provided with serrated teeth 29.

The face of the star wheel 22 adjacent to the element 26 has a plurality of recesses 31 and the adjacent face of the element 26 carries a plurality of projections 32, herein illustrated as two in number. It is to be understood, however, that any number of projections may be employed, the two herein illustrated being diametrically disposed. A dished-washer spring 33 is disposed between the wall 27 of the element 26 and the end of the sleeve 12 for holding the wall against the face of the star wheel 22 with a predetermined force. This force is regulated by the number and size of the recesses and projections which permit slippage to occur between the star wheel and element 26 when too great a force has been applied. This prevents too much force being applied between the shoes which would produce a drag on the drum. The brake shoes will be set to a desired position at all times as the brake bands wear without applying any drag between the band surfaces and the drum.

Various means known in the art, may be provided for turning the element 26, herein illustrated a flange end 35 of an arm 36 which is pivoted at 37 to the web 15 of the brake shoe 17 and to the backing plate 38. The opposite end of the arm 36 is secured by a link 39 to a pin 41 also carried by the plate 38. The flange end 35 will move upwardly to engage the next adjacent tooth 29 upon applying the brake at the time the vehicle is moving backwardly. As the brake is again applied when the vehicle is moving forwardly, the arm 36 will move downwardly and turn the element 26 which screws the stud 21 outwardly of the sleeve 11 to lengthen the space between the webs 14 and 15. Should the brakes be properly adjusted and need no more extension between the ends of the webs 14 and 15, the force required to turn the stud 21 will be such as to cause the element 26 to slip relative to the star wheel 22 which thereby prevents the application of an undesired force between the adjacent ends of the webs 14 and 15. A spring 42 applies a pressure between the two webs 14 and 15 to retain the ends thereof at the bottom of the slots 13 of the sleeves 11 and 12.

The spring also provides a force to urge the flange end 35 away from the teeth 29. The operation arm 36 is disclosed in greater detail in the co-pending application of David T. Ayers, Jr., Ser. No. 566,548, filed July 20, 1966, for Drum Brake With Automatic Adjuster, which was assigned to the assignee of the present invention.

What is claimed is:

1. In a device for adjusting the brake shoes within a brake drum, a stud mechanism between adjacent ends of the shoe, a flange on the stud of the mechanism, a face on one side of said flange, a driven element, a face on the side of the driven element abutting said face of the flange, drive means for said driven element, and holding means between said faces which permits the faces to relatively move when the resistance of the stud to rotation reaches a predetermined amount.

2. In a brake adjusting mechanism as recited in claim 1, wherein the stud mechanism embodies a pair of sleeves, and a stud threaded in one sleeve having a shaft portion extending in the other sleeve for rotation in said sleeves, said driven element being cup-shaped having a peripheral wall extending over said shaft portion.

3. In a brake adjusting mechanism as recited in claim 2, wherein said cup-shaped driven element has serrated teeth on its outer peripheral edge and said drive means embodies an arm on the shoe which is moved upwardly to engage a serrated tooth and moved downwardly to rotate the driven element upon applying the brakes when the vehicle is moving rearwardly and when moving forwardly, respectively.

4. In a brake adjusting mechanism as recited in claim 2, wherein the flange on the stud has teeth thereon forming a star wheel by which it is rotated independently of the cup-shaped driven element to permit manual adjustment.

5. In a brake mechanism as recited in claim 3, wherein at least one recess is provided in one abutting face and at least one mating projection is provided in the other face, and spring means urging said faces together to produce a predetermined holding force against relative rotation between the faces.

References Cited
UNITED STATES PATENTS

| | | | |
|---|---|---|---|
| 3,010,544 | 11/1961 | Dahle et al. | 188—79.5 |
| 3,067,840 | 12/1962 | Werner | 188—79.5 |
| 3,131,787 | 5/1964 | Swift | 188—196 |
| 3,220,516 | 11/1965 | Swift | 188—196 |

DUANE A. REGER, *Primary Examiner.*